United States Patent [19]
Wolf

[11] Patent Number: 4,970,912
[45] Date of Patent: Nov. 20, 1990

[54] MOTION TRANSMITTING REMOTE CONTROL ASSEMBLY

[75] Inventor: Jeffrey P. Wolf, Hatboro, Pa.

[73] Assignee: Teleflex Incorporated, Limerick, Pa.

[21] Appl. No.: 203,499

[22] Filed: Jun. 7, 1988

[51] Int. Cl.$^5$ .............................................. F16C 1/12
[52] U.S. Cl. ..................................... 74/501.6; 74/504
[58] Field of Search .................... 74/500.5, 501.6, 502, 74/503, 505, 506, 526, 504, 501.5 R, 479

[56] References Cited

U.S. PATENT DOCUMENTS

| | | | |
|---|---|---|---|
| 1,580,877 | 4/1926 | Barber | 74/502.4 |
| 2,538,787 | 1/1951 | Manhartsberger | 75/500.5 X |
| 3,160,027 | 12/1964 | Waner | 74/501.6 |
| 3,307,421 | 3/1967 | Gilmore | 74/501.6 |
| 3,550,469 | 12/1970 | Morse | 74/501.6 |
| 3,771,384 | 11/1973 | Hackman | 74/505 |
| 3,838,607 | 10/1974 | Hemens | 74/501.6 X |
| 3,958,524 | 5/1976 | Cantley | 74/479 X |
| 4,400,993 | 8/1983 | Kobayashi et al. | 74/501.5 R |

FOREIGN PATENT DOCUMENTS

| | | | |
|---|---|---|---|
| 19386 | of 0000 | France | 74/501.6 |
| 825041 | of 0000 | France | 74/501.6 |
| 174754 | of 0000 | United Kingdom | 74/501.6 |

*Primary Examiner*—Rodney M. Lindsey
*Attorney, Agent, or Firm*—Reising, Ethington, Barnard, Perry & Milton

[57] ABSTRACT

A motion transmitting remote control assembly (10) includes a moveable core element (24) having a wire (26) wound helically thereabout to form a continuous thread. An actuator (34, 38) for moving the core element (24) includes a cable gear (52) having peripheral gear teeth (60) engaging the thread-like wire (26) on the core element (24). A handle (72) rotates the cable gear (52) to move the core element (24). A lost motion connection is provided between the cable gear (52) and the handle (72) including a leg (66) extending radially outwardly from a rotatable sleeve (64) of the handle (72) which contacts an abutting surface (86) moveable with the cable gear (52). When the core element (24) is moved independently of the handle (72), the abutting surface (86) rotates away from the leg (66) thus allowing the handle (72) to remain stationary whereby a lost motion connection is provided between the core element (24) and the handle (72).

18 Claims, 3 Drawing Sheets

MOTION TRANSMITTING REMOTE CONTROL ASSEMBLY

FIELD OF THE INVENTION

The subject invention relates to a motion transmitting remote control assembly of the type for transmitting forces along a curved path by a flexible motion transmitting core element moveably supported within a conduit.

BACKGROUND ART

On a ship, it is desirable in some instances to provide more than one remote valve actuator for a remote control assembly. One such instance is in the case of a remotely controlled emergency fuel shut-off valve where it is desirable to have an actuator at several locations on board the ship, remote from the valve, so that during an emergency situation the valve may be actuated from any one of several locations about the ship.

Valve actuators of this type typically include at least one drive means, typically in the form of a handle, for manually actuating a core element. In the prior art motion transmitting remote control assemblies which include two or more actuators engaging a common core element, the handles of each actuator assembly are actuated in unison, i.e., as slaves, whenever the core element is moved. That is to say, when the handle of one actuator is moved to displace the core element, the handles of the additional actuators are also automatically moved due to their engagement with the one common core element.

An example of a prior art motion transmitting remote control assembly including two actuators engaging one common core element is shown in the U.S. Pat. No. 4,249,771 to Gergoe et al, issued Feb. 10, 1981. The Gergoe patent discloses two similar actuators including cable gears having peripherally disposed gear teeth which engage a helical thread extending along the core element. The Gergoe patent exemplifies the deficient state of the prior art in that movement of one of the actuator handles also moves the handle of the other remote actuator.

In many cases, it is desirable to lock the handle of an actuator assembly into a rest, i.e., unactuated, position. Under the teaching of the prior art, whenever one actuator handle is locked in position, all of the handles of the other actuator assemblies engaging the same core element become immoveably locked in place also. This situation is highly undesirable in applications where the core element actuates an emergency type system, such as an emergency fuel shut-off valve of a large ship. In such a situation, it is prudent to lock the handle into the unactuated position to prevent inadvertent actuation, although highly undesirable to require each individual actuator handle to be unlocked prior to actuating the emergency system.

SUMMARY OF THE INVENTION AND ADVANTAGES

The subject invention provides a motion transmitting remote control assembly of the type for transmitting forces in a curved path by a flexible motion transmitting core element. The subject invention comprises one core element having an actuated end and a free end. A first actuator means is engagable with the core element adjacent the free end for moving the core element. The first actuator means includes an associated first drive means moveable from a rest position for applying a force to the core element during movement from the rest position. An intermediate second actuator means engages the core element between the actuated end and the first actuator means for moving the core element. The second actuator means includes an associated second drive means moveable from a rest position for applying a force to the core element during movement from the rest position. The subject invention is characterized by at least one of the first and second actuator means including anti-feedback means disposed between the core element and its associated drive means for allowing the associated drive means to remain in the rest position when the core element is moved independently of the one actuator means whereby a lost motion connection is provided between the core element and the associated drive means of the one actuator means.

The subject invention overcomes the deficiencies present in the prior art by including anti-feedback means between the core element and the drive means so that when one of the actuator means is actuated to move the core element, the drive means of other remote actuator means may remain stationary.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
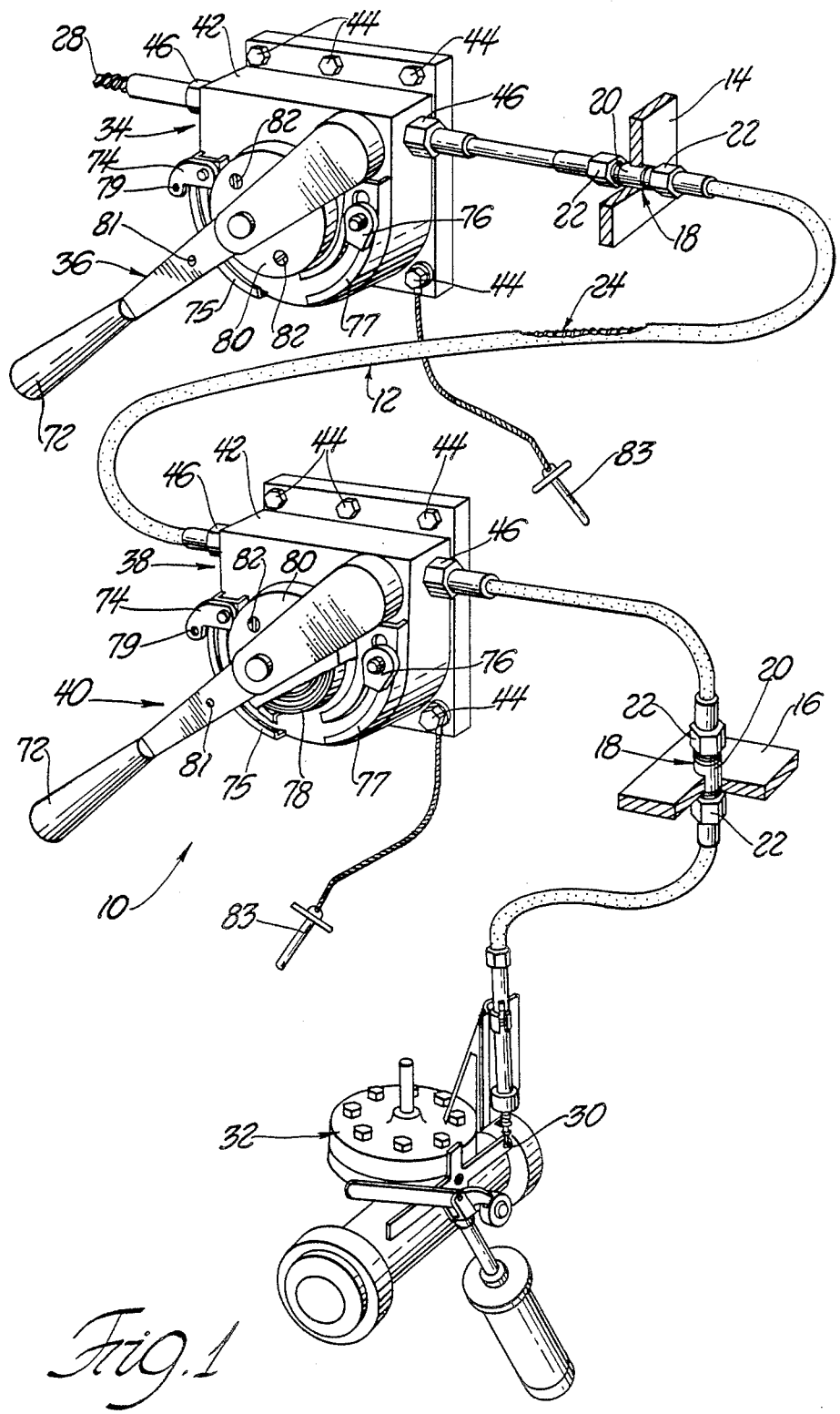
FIG. 1 is a perspective view showing a preferred embodiment of the subject invention.

A motion transmitting remote control assembly according to the subject invention is generally shown at 10 in FIG. 1. The assembly 10 includes a tubular conduit, generally indicated at 12, which is preferably of the type including an inner tubular member made of an organic polymeric material and surrounded by a plurality of long lay wires disposed helically thereabout with a case of organic polymeric material disposed about the long lay wires and the inner tubular member. Similarly, the long lay wires may be disposed about the inner tubular member in a braided fashion, as is well known in the art, and having the case of organic polymeric material thereabout. For many applications, such as in a large marine vessel, the conduit 12 must pass through various support structures such as bulkheads 14 and decks 16, between the remote actuators and the member to be actuated. For such situations, the conduit 12 includes conduit connectors, generally indicated at 18, which adapt the conduit 12 for passing through the various support structures. Each conduit connector 18 includes a tubular nipple 20 having male threaded portions at both ends thereof adapted to pass through the bulkhead 14 or deck 16. Nuts 22 matingly engage the threaded ends of the nipple 20 to connect the members together and provide a continuous passage through the conduit 12.

A flexible motion transmitting core element, generally indicated at 24, is movably supported within the conduit 12. That is to say, as the conduit 12 is fixed between the various support structures, the core element 24 is free to move within the conduit's continuous internal passage. As perhaps best shown in FIGS. 4 and 5, the core element 24 includes a wire 26 fixedly wrapped thereabout in a helical fashion and extending therealong in spaced thread turns. In this manner, the wire 26 gives the appearance of a continuous thread extending along the core element 24. The core element 24 has a free end 28 and an actuated end 30, as shown in FIG. 1. The actuated end 30 controls a valve assembly, generally indicated at 32, such as the type commonly employed in a fuel line of a ship for emergency fuel shut-off.

A first actuator means, generally shown at 34, engages the core element 24 adjacent its free end 28 for moving the core element 24 to actuate the valve assembly 32. The first actuator means 34 includes an associated first drive means, generally indicated at 36, which is moveable from a rest position for applying a force to the core element 24 during movement from the rest position. Additionally, at least one intermediate second actuator means, generally shown at 38, engages the core element 24 between the actuated end 30 and the first actuator means 34 for moving the core element 24 to actuate the valve assembly 32. The second actuator means 38 includes an associated second drive means, generally indicated at 40, which is moveable from a rest position for applying a force to the core element 24 during movement from the rest position.

Preferably, the first actuator means 34 and the second actuator means 38 are structurally identical. Therefore, the ensuing description of the individual elements comprising the first actuator means 34 and the second actuator means 38 will make reference only to one preferred embodiment. That is, due to the identical structure of both the first 34 and second 38 actuator means, the following reference numerals indicating individual components thereof will be applicable to both the first 34 and second 38 actuator means.

The first 34 and second 38 actuator means each include an actuator housing 42 adapted for mounting on a supporting structure, such as a bulkhead 14. As shown in FIG. 1, hexagonal-head mounting bolts 44 extend through the housing 42 and are securely fastened to the supporting bulkhead structure 14. Suitable connecting nuts 46 are rotatably disposed on the conduit 12 for connection with the housing 42.

Figure 3:
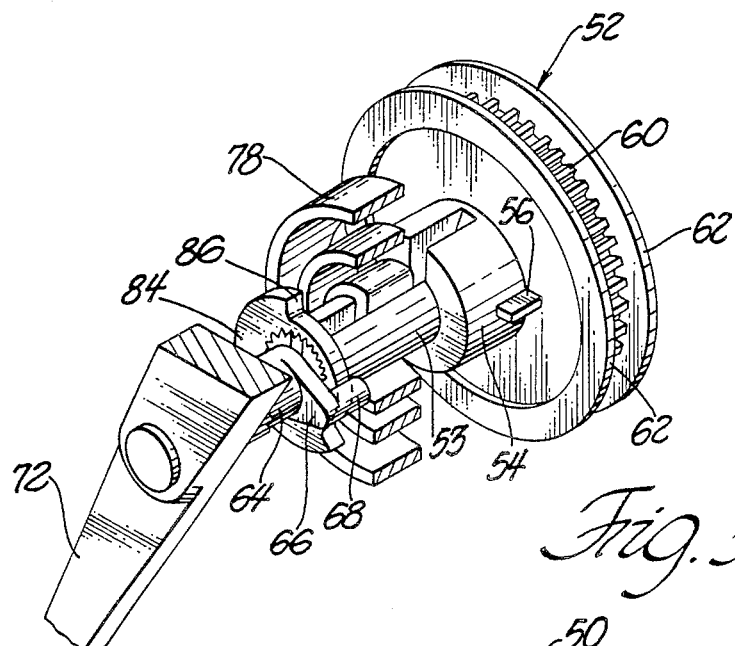
FIG. 3 is a perspective view showing some of the internal elements of the actuator means.
Figure 4:
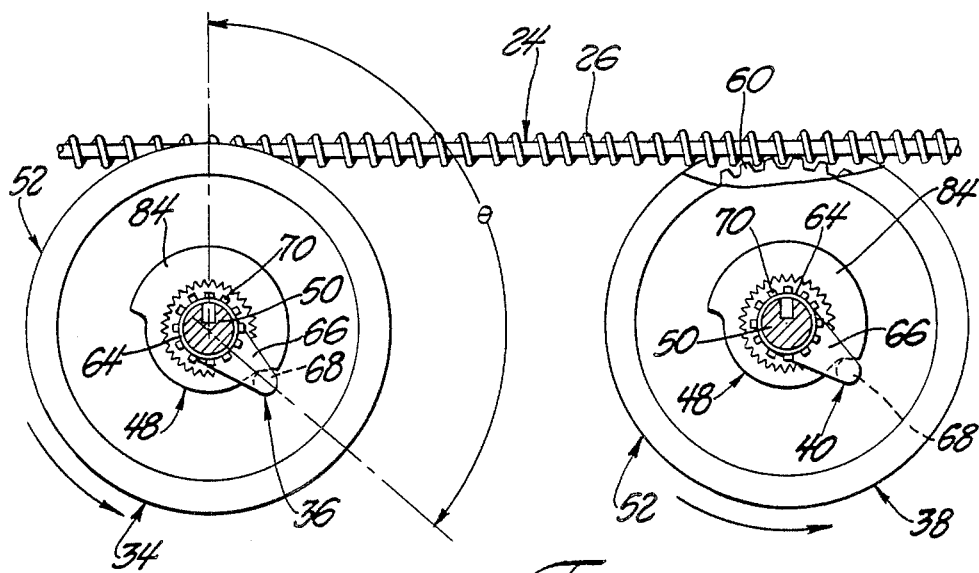
FIG. 4 is a schematic view showing the first and second actuator means in a rest position while engaging the core element.

The subject invention is characterized by including anti-feedback means, generally indicated at 48, disposed between the core element 24 and the first 36 and second 40 drive means of the respective first 34 and second 38 actuator means, as shown in FIGS. 3 and 4. The anti-feedback means 48 allows one of the drive means 36 or 40 of one of the first 34 or second 38 actuator means to remain in the rest position when the core element 24 is moved by the other actuator means or independently of both of the actuator means 34, 38. For example, if the first drive means 36 of the first actuator means 34 is moved from the rest position to displace the core element 24, the second drive means 40 of the second actuator means 38 will remain in the rest position. Therefore, a lost motion connection is provided between the core element 24 and the associated drive means 36, 40 of the respective first 34 and second 38 actuator means for allowing lost motion between the core element 24 and the drive means 36, 40 whenever the core element 24 is moved by a source outside of an individual actuator means.

Figure 2:
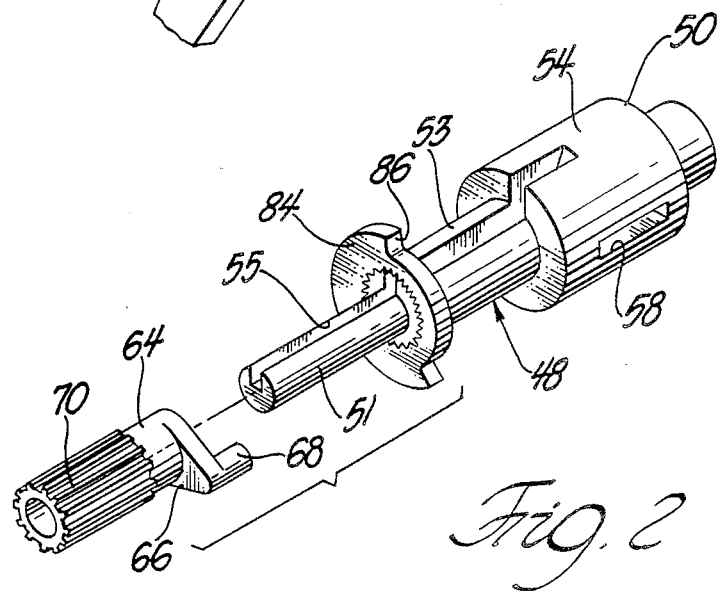
FIG. 2 is an exploded perspective view showing internal elements in the actuator means.

The anti-feedback means 48 includes a shaft 50 having a longitudinal axis extending centrally therethrough, as shown in FIGS. 2 and 3. The shaft 50 is supported in the housing 42 for rotation about its longitudinal axis in response to a force supplied from the drive means 36, 40. The shaft 50 is orientated in the housing 42 such that its longitudinal axis is maintained perpendicular of the core element 24 passing through the housing 42. The anti-feedback means 48 also includes a cable gear 52 centrally and fixedly disposed on the shaft 50 for rotation therewith. More specifically, as shown in FIGS. 2 and 3, the shaft 50 includes a small diameter portion 51, an intermediate diameter portion 53, and an enlarged diameter portion 54. The cable gear 52 is disposed on the enlarged diameter portion 54. A key 56 is disposed in a key slot 58 in the enlarged diameter portion 54 of the shaft 50 for preventing rotation of the cable gear 52 about the shaft 50.

The shaft 50 further includes an axially extending keyway 55 disposed entirely through the small 51 and intermediate 53 diameter portions. The intermediate diameter portion 53, adjacent the small diameter portion 51, includes axially extending male splines, for reasons to be addressed subsequently.

The cable gear 52 has a periphery adapted for engagement with the core element 24. As shown in FIGS. 3 and 4, the periphery of the cable gear 52 includes a plurality of gear teeth 60 disposed thereabout for interlocking engagement with the wire 26 of the core element 24. Disposed on each side of the gear teeth 60 are annular lips 62 which define a continuous groove therebetween for directing the core element 24 to remain in engagement with the gear teeth 60. That is to say, the lips 62 straddle each side of the core element 24 as the core element 24 is positioned in engagement with the gear teeth 60 of the cable gear 52. In this manner, the cable gear 52 of the anti-feedback means 48 is continuously engaging the core element 24 so that whenever the core element 24 moves, the cable gear 52 also moves, and visa-versa.

Both of the first 36 and second 40 drive means include a sleeve 64 rotatably disposed about one end of the shaft 50, distal the cable gear 52, for rotative movement relative to the shaft 50, as best shown in FIG. 2. In other words, the sleeve 64 is disposed about the smaller diameter end of the shaft 50 and provided with a clearance fit so that the sleeve 64 is freely rotatably about the shaft 50. At one end of the sleeve 64, adjacent the cable gear 52, is disposed an L-shaped leg 66 extending radially outwardly from the sleeve 64 for applying a force to the anti-feedback means 48 during movement from the rest position. Or, said another way, as the drive means 36, 40 is moved from the rest position, the leg 66 applies a force to rotate the cable gear 52 for ultimately displacing the core element 24 within the conduit 12. The leg 66 includes a small cylindrical projection 68 having a central longitudinal axis parallel to the longitudinal axis of the shaft 50 and the sleeve 64. The end of the sleeve 64 distal the leg 66 is provided with a series of axially extending male splines 70.

The first 36 and second 40 drive means also include a handle 72 having a female splined bore (not shown) for engagement with the male splines 70 on the sleeve 64. The handle 72 extends radially outwardly from the sleeve 64 for arcuate movement from the rest position to a fully actuated position to ultimately displace the core element 24. The handles 72 of both the first 34 and second 38 actuator means are shown adjacent the rest position in FIG. 1. The handle 72 is disposed externally of the housing 42 for accessibility to an operator.

Preferably, the handles 72 are statically balanced about an axis passing centrally through their respective splined bores such that when the assembly 10 is in operation, external forces acting upon the actuator means 34, 38 will not inertially induce rotation of the handles 72. A further advantage of statically balanced handles 72 is that whenever an operator positions a handle 72 relative to the housing 42, the handle 72 will remain in that position.

Stop means 74, 76 are provided in the form of projections extending outwardly from the housing 42 for preventing movement of the handle 72 past the rest position or the fully actuated position during movement. More specifically, the one projection 74 prevents movement of the handle 72 beyond the rest position and the other projection 76 prevents movement of the handle 72 past the fully actuated position.

In the preferred embodiment shown in FIG. 1, the projections 74, 76 are moveably disposed in associated tracks 75, 77, respectively. The tracks 75, 77 are disposed on the exterior of the housing 42 and extend arcuately about the longitudinal axis of the shaft 50. Threaded fasteners extend through each of the projections 74, 76 and clamp behind their associated tracks 75, 77 to allow simple adjustment of the position of each of the projections 74, 76.

The one projection 74 preventing movement of the handle 72 past the rest position preferably includes an outwardly extending tongue having an aperture 79 disposed therethrough. The aperture 79 aligns with a corresponding aperture 81 extending through the handle 72 for allowing a pin 83 or other such member to be simultaneously passed through the two aligned apertures 79, 81 to lock the handle 72 in the rest position. In this manner, the handles 72 of each of the remote actuator means 34, 38 may be locked in the rest, i.e., unactuated, position to prevent inadvertent actuation.

A biasing means 78 is disposed between the housing 42 and the anti-feedback means 48 of the first 34 and second 38 actuator means for biasing the cable gear 52 toward an unactuated position. More particularly, the biasing means 78 includes a flat wound coil spring having an inner end disposed in the keyway 55 of the shaft 50 and an outer end attached to the housing 42 in a manner well known in the art. A protective cover 80 is positioned over the biasing means 78 and secured to the housing 42 by three screws 82.

The anti-feedback means 48 includes an abutting plate 84 fixedly disposed on the shaft 50. More specifically, the abutting plate 84 has an internally splined bore for engaging the splined portion of the intermediate diameter portion 53 of the shaft 50. The plate 84 has an irregular shaped periphery defining an abutting surface 86 extending radially outwardly of the longitudinal axis of the shaft 50 for abutting the cylindrical projection 68 of the leg 66 during movement of the first 36 and second 40 drive means from the rest position. That is, as the handle 72 moves from the rest position toward the fully actuated position, the cylindrical projection 68 of the leg 66 presses against the abutting surface 86 on the plate 84 to directly rotate the cable gear 52 and thus move the core element 24.

Figure 5:
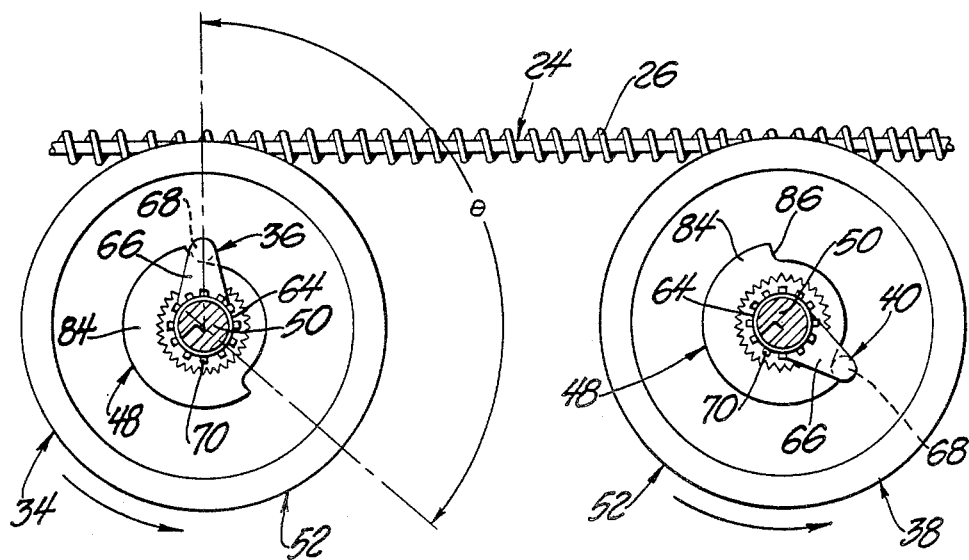
FIG. 5 is a schematic view showing the first and second actuator means of FIG. 4 with the first drive means of the first actuator means moved to a fully actuated position.

Referring now to FIGS. 4 and 5, the operation of the subject invention will be presently addressed. In FIG. 4, both the first actuator means 34 and the second actuator means 38 are shown with their associated respective drive means 36, 40 in the rest position. The legs 66 of the first 34 and second 38 actuator means are in engagement with the abutting surfaces 86 of each of the plates 84.

An angle $\theta$ is shown in FIGS. 4 and 5 signifying a typical arcuate stroke between the rest position and the fully actuated position. The radial reference line extending centrally through the leg 66 of the first actuator means 34 in FIG. 4 represents the position of the leg 66 when the first drive means 36 is in the rest position, while the radial reference line extending vertically from the center of the shaft 50 signifies the position of the leg 66 when the first drive means 36 is in the fully actuated position.

In FIG. 5, the first drive means 36 of the first actuator means 34 is shown moved to the fully actuated position. During movement from the rest position to the fully actuated position, the cylindrical projection 68 on the leg 66 of the first drive means 36 continuously abuts the abutting surface 86 to rotate the entire shaft 50 and cable gear 52 by angle $\theta$. Thus, the core element 24 is displaced to the left, as seen from FIG. 5, a distance equal to $\theta$ (in radians) multiplied by the radial distance between the longitudinal axis of the shaft 50 and the gear teeth 60.

Because the cable gear 52 of the second actuator means 38 is also in engagement with the core element 24, the shaft 50 and the cable gear 52 and the plate 84 are also moved whenever the core element 24 is moved. However, because the sleeve 64 is freely rotatable about the shaft 50, the abutting surface 86 of the second actuator means 38 merely rotates away from cylindrical projection 68 on the leg 66 of the second drive means 40, thus allowing the handle 72 of the second drive means 40 to remain in the rest position, as shown in FIG. 5.

This is particularly advantageous in that if one of the remote actuator means, say for example the first actuator means 34, is actuated while the handle 72 of the second actuator means 38 remains locked in the rest position, the core member 24 may nevertheless be displaced due to the lost motion connection provided between the abutting surface 86 and the cylindrical projection 68 on the leg 66. Therefore, in an emergency situation, only one of the handles 72 would be required to be unlocked, i.e., unpinned, to actuate the valve 32.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly (10) of the type for transmitting forces in a curved path by a flexible motion transmitting core element (24), said assembly (10) comprising: one core element (24) having an actuated end (30) and a free end (28); a first actuator means (34) engagable with said core element (24) adjacent said free end (28) for moving said core element (24), said first actuator means (34) including an associated first drive means (36) moveable from a rest position for applying a force to said core element (24) during movement from said rest position; an intermediate second actuator means (38) engagable with said core element (24) between said actuated end (30) and said first actuator means (34) for moving said core element (24), said second actuator means (38) including an associated second drive means (40) moveable from a rest position for applying a force to said core element (24) during movement from said rest position; said assembly (10) characterized by at least one of said first (34) and second (38) actuator means including anti-feedback means (48) disposed between said core element (24) and its associated drive means (36, 40) for allowing the associated drive means (36, 40) to remain moveably disposed in said rest position when said core element (24) is moved independently of said one actuator means (34, 38) whereby a lost motion connection is provided between said core element (24) and the associated drive means (36, 40) of said one actuator means (34, 38).

2. An assembly (10) as set forth in claim 1 further characterized by said anti-feedback means (48) continuously engaging said core element (24).

3. An assembly (10) as set forth in either of claims 1 or 2 further characterized by said anti-feedback means (48) including a shaft (50) having a longitudinal axis and supported for rotation about said longitudinal axis in response to a force applied from the associated drive means (36, 40).

4. An assembly (10) as set forth in claim 3 further characterized by the associated drive means (36, 40) of said one actuator means (34, 38) including a sleeve (64) rotatably disposed about said shaft (50) for rotative movement relative to said shaft (50).

5. An assembly (10) as set forth in claim 4 further characterized by the associated drive means (36, 40) of said one actuator means (34, 38) including a leg (66) disposed radially outwardly of said sleeve (64) for applying a force to said anti-feedback means (48) during movement from said rest position.

6. An assembly (10) as set forth in claim 5 further characterized by said anti-feedback means (48) including an abutting surface (86) extending radially outwardly of said shaft (50) for abutting said leg (66) during movement of the associated drive means (36, 40) of said one actuator means (34, 38) from said rest position.

7. An assembly (10) as set forth in claim 6 further characterized by said anti-feedback means (48) including a cable gear (52) having a periphery adapted for engagement with said core element (24), said cable gear (52) centrally and fixedly disposed on said shaft (50) for rotation therewith.

8. An assembly (10) as set forth in claim 7 further characterized by the associated drive means (36, 40) of said one actuator means (34, 38) including a handle (72) extending radially outwardly of said sleeve (64) for arcuate movement from said rest position to a fully actuated position to move said leg (66) against said abutting surface (86).

9. An assembly (10) as set forth in claim 8 further characterized by said core element (24) including at least one wire (26) fixedly wrapped thereabout in helical fashion and extending therealong in spaced thread turns.

10. An assembly (10) as set forth in claim 9 further characterized by said periphery of said cable gear (52) including a plurality of gear teeth (60) disposed thereabout for interlocking with said wire (26) of said core element (24).

11. An assembly (10) as set forth in claim 10 further characterized by said periphery of said cable gear (52) including two annular lips (62) extending outwardly therefrom, one of said lips (62) disposed on each side of said gear teeth (60) and defining a continuous groove therebetween for guiding said core element (24) to remain in engagement with said gear teeth (60).

12. An assembly (10) as set forth in claim 11 further characterized by said one actuator means (34, 38) including an actuator housing (42) adapted for mounting on a bulkhead (14), said housing (42) rotatably supporting said shaft (50) perpendicular of said core element (24).

13. An assembly (10) as set forth in claim 12 further characterized by said housing (42) including stop means (74, 76) for preventing movement of said handle (72) past said rest position or said fully actuated position during movement.

14. An assembly (10) as set forth in claim 13 further characterized by said stop means (74, 76) including tracks (75, 77) for providing positional adjustment of said stop means (74, 76) relative to said housing (42).

15. An assembly (10) as set forth in claim 13 further characterized by said one actuator means (34, 38) including biasing means (78) disposed between said housing (42) and said anti-feedback means (48) for biasing said cable gear (52) in a predetermined direction.

16. An assembly (10) as set forth in claim 15 further characterized by said biasing means (78) including a flat wound coil spring.

17. An assembly (10) as set forth in claim 16 further characterized by including a conduit (12) disposed about said core element (24) for moveably supporting said core element (24).

18. A remote actuator (34, 38) of the type for transmitting forces to a flexible motion transmitting core element (24) moveably supported in a conduit (12), said actuator (34, 38) comprising: a support housing (42); a shaft (50) having a central longitudinal axis and supported in said housing (42) for rotation about said longitudinal axis; a cable gear (52) fixedly disposed on said shaft (50) for rotation therewith and having a periphery adapted for engaging the core element (24); an abutting plate (84) fixedly disposed on said shaft (50) for rotation therewith, said abutting plate (84) including an abutting surface (86) radially spaced from said longitudinal axis of said shaft (50); a sleeve (64) rotatably disposed about said shaft (50) including an L-shaped leg (66) extending radially outwardly therefrom for abutment with said abutting surface (86); and a handle (72) fixedly disposed on said sleeve (64) and extending radially outwardly therefrom.

* * * * *